United States Patent [19]
Ramsey, III

[11] 3,890,962
[45] June 24, 1975

[54] DISPOSABLE MANOMETER

[75] Inventor: Maynard Ramsey, III, Durham, N.C.

[73] Assignee: Ramtech, Inc., Tampa, Fla.

[22] Filed: Mar. 5, 1973

[21] Appl. No.: 338,283

Related U.S. Application Data

[63] Continuation-in-part of Ser. No. 84,718, Oct. 28, 1970, Pat. No. 3,720,211, which is a continuation-in-part of Ser. No. 881,121, Dec. 1, 1969, Pat. No. 3,648,687.

[52] U.S. Cl.............. 128/2.05 D; 73/409; 215/246
[51] Int. Cl............................................ A61b 5/02
[58] Field of Search ............... 128/2.05 D, 2.05 E; 73/402, 406, 409; 215/38 A:35

[56] References Cited
UNITED STATES PATENTS

| | | | |
|---|---|---|---|
| 1,877,606 | 9/1932 | Shoemaker | 215/38 A |
| 2,361,464 | 10/1944 | Edwards et al. | 215/38 A |
| 2,403,734 | 7/1946 | Malm et al. | 215/38 A X |
| 2,772,014 | 11/1956 | Clark | 215/82 |
| 2,863,582 | 12/1958 | Owens | 215/38 A |
| 3,235,112 | 2/1966 | Fillwalk et al. | 215/38 A |
| 3,640,417 | 2/1972 | Sakuai | 215/38 A X |
| 3,648,687 | 3/1972 | Ramsey | 128/2.05 D |
| 3,720,201 | 3/1973 | Ramsey | 128/2.05 D |

OTHER PUBLICATIONS

*Anesthesiology*, Vol. 18, No. 6, Nov.–Dec., 1957, pp. 906–907.
*Surgery*, Vol. 61, 1967, May, pp. 711–712.
*Surgery*, Vol. 64, 1968, No. 6, Dec., p. 1161.

*Primary Examiner*—Kyle L. Howell
*Attorney, Agent, or Firm*—Gipple & Hale

[57] ABSTRACT

A disposable pressure monitoring device which is designed to be discarded after each use. This device utilizes a tube which is separated by a flexible diaphragm, one end of the tube being attached to the source of pressure, with the distal end being attached to a pressure sensing device through the use of a stopper. The stopper is kept in a fixed position in the tube by a closure device which holds the stopper to the tube. The pressure sensing device is of any standard reusable type and does not require sterilization.

6 Claims, 6 Drawing Figures

PATENTED JUN 24 1975                3,890,962
SHEET    1
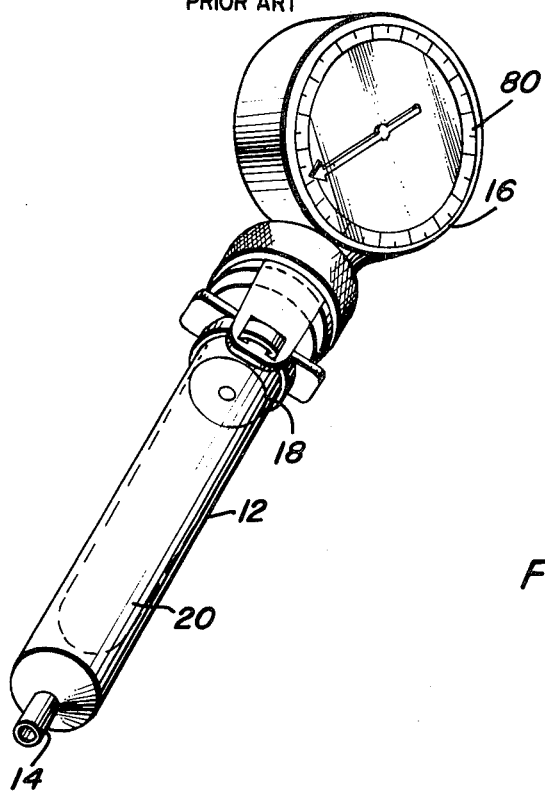
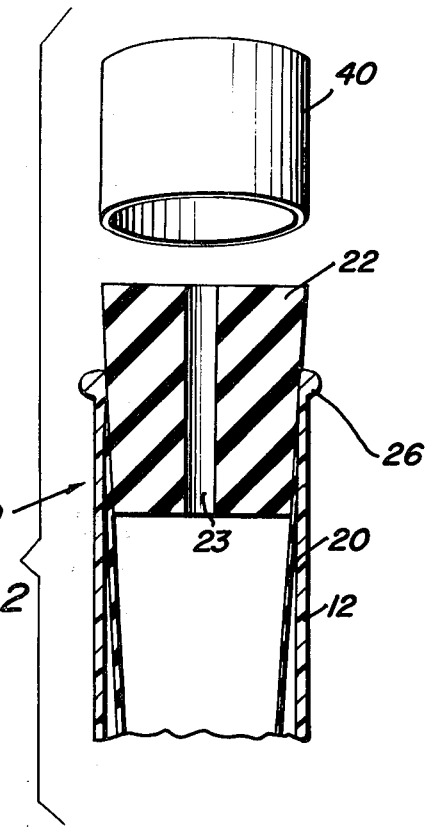
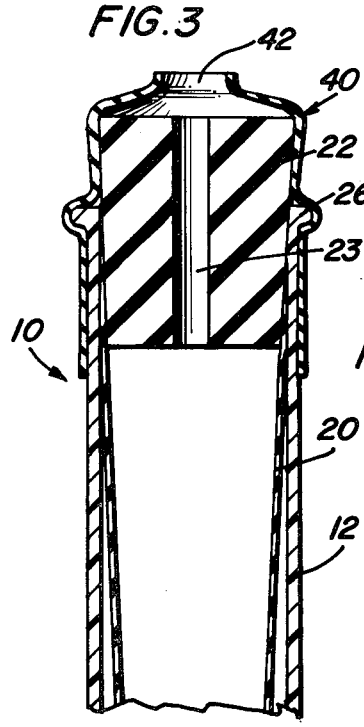
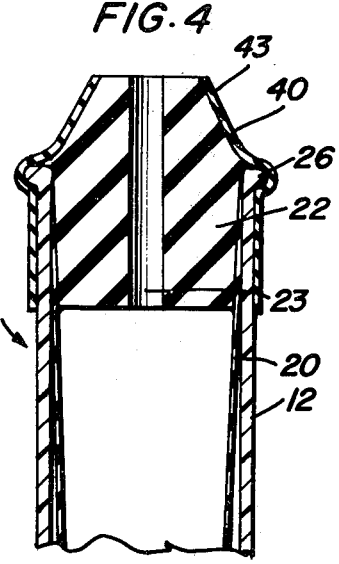

DISPOSABLE MANOMETER

This application is a continuation-in-part of application Ser. No. 84,718, filed Oct. 28, 1970, now U.S. Pat. No. 3,720,211, which was a continuation-in-part of application Ser. No. 881,121 filed Dec. 1, 1969, now issued into U.S. Pat. No. 3,648,687.

BACKGROUND OF THE INVENTION

1. Field of the Invention

The present invention relates to pressure indicating devices of the type used for the measurement of body fluid pressures and more particularly to a direct reading, disposable manometer device adapted for use in the measurement of arterial, venous blood and cerebrospinal fluid pressures.

2. Description of the Prior Art

The pressures of fluids in the vessels of all living things are indications of many facts which are of great value to those engaged in medical, biological and other related fields. In the case of human beings, the pressure in the vascular system is measured for many reasons, including diagnosis of certain ailments and ascertainment of the progress of therapy, etc. For instance, the determination of venous blood pressure is an essential element in the diagnosis of a patient suspected of cardiac disease. A normal blood venous pressure ranges between 80–120 millimeters water, whereas elevations of venous pressure above that range are found in cases of congestive heart failure.

Similarly, cerebrospinal fluid pressure is normally 70–80 millimeters water, whereas elevated pressures may be found, for example, in cases of intracranial tumor, encephalitis, and cerebral abscess, hydatid cysts, extra subdural, subarachnoid and intra cerebral hemorrhage, meningitis, acute encephalitis, hydrocephalus, crainiostenosis, cerebral edema following head injury, acute nephritis, hypertensive encephalopathy and eclampsia. Lower than normal cerebrospinal pressures may be observed in such cases as spinal block by tumor, some subdural hematomas, and intracranial space occupying lesions which produce displacement of normal structures to cause pressure coning at the foramen magnum or tentorial opening.

The most common method of obtaining arterial blood pressure has been to gradually apply constrictive pressure about the limb of the patient until the flow of blood through a vessel has been arrested, as determined by listening to a stethoscope applied over the vessel at a point distal the point of constriction. Then, upon gradual release of the constricted pressure, the beginning of the flow through the vessel can be heard and the constricted pressure is noted on the gauge reading in millimeters of mercury. The pressure that is noted is the systolic pressure. The pressure is then further gradually released until the sounds of the flow again cease and the pressure is again noted; this being the diastolic pressure. The difference between the two pressures is termed the pulse pressure. The constriction pressure heretofore has been derived from an inflatable cup connected to a mercury column manometer or to an aneroid type gauge having a dial scale calibrated in millimeters of mercury. While this common device is satisfactory for measuring the diastolic-systolic pressure range for a discrete period of time, it has the obvious disadvantage of not being able to continuously monitor the patient's blood pressure.

In the prior art, many attempts have been made to devise blood pressure gauges which are protable, inexpensive and yet provide the attending physician with an accurate determination of the patient's blood pressure. Once such a device discloses systolic blood pressure measuring instruments which employ telescopically related, spring loaded tubes, the tubes being biased in an extended position. By exerting axial pressure on the tubes against an artery until blood flow in that artery is cut off, and by monitoring the relative displacement of the tubes from the fully extended position required to produce such flow cut off, the systolic pressure is monitored. Another prior art device employs a pointer extending from an inner tube through a longitudinal slot in an outer tube, the outer tube having calibrated markings adjacent the slot. The disadvantage with this arrangement lies in the fact that the tubes, and hence the pointer, return to the original biased position upon removal of the instrument from the body, thereby requiring the operator to take a reading while exerting direct pressure. Such a technique has been found to be inconvenient.

Generally speaking, however, the indirect methods of making fluid pressure measurements, are not as accurate as any method which utilizes the particular fluid itself operating directly against a pressure sensing device.

A direct measuring disposable blood pressure device invented by applicant is illustrated in U.S. Pat. No. 3,648,687 and discloses an effective direct-measuring apparatus now in use for measurement of arterial, venous and cerebrospinal fluid pressures. This apparatus is comprised of several complicated parts and is difficult and expensive to assemble before it can be used. It would thus be an advantage to develop a direct intravessel pressure measuring device which allows for continuous monitoring of the level of pressure while at the same time being of simple construction, inexpensive and disposable so as to eliminate the sterilization problems.

The present invention differs from the prior art in that it provides a simple disposable pressure manometer device with novel closure means especially adapted for the measurement of arterial or vascular blood and cerebral fluid pressure which can be disposed of after one use. The invention additionally provides a direct reading, self-contained, mechanical hypodermic pressure manometer which is used in conjunction with a standard aneroid manometer or other sensing device and is disposable after each use with the feature that it can be carried in a doctor's valise or in an emergency vehicle.

The present invention has no moving parts; requires no power source for operation, and utilizes no chemicals or additional apparatus or instruments; other than a standard aneriod manometer. Furthermore, the apparatus is readily transportable so that the measurement of fluid pressures in humans and animals can be safely, quickly and easily accomplished by laboratory technicians without any particular skill other than that provided by conventional training.

The manometer is so simple and inexpensive in construction that it may be discarded after use instead of being washed and resterilized, so that the only sterilization required is at the place of manufacture where sterilization and adequate testing to assure sterility can be effected in mass production at reduced cost.

SUMMARY OF THE INVENTION

In the invention a tube or barrel is provided with a flexible diaphragm and sealed stopper assembly which seals the tube into an upper and lower plena. The lower plenum is connected to a suitable catheter and/or hypodermic needle. The upper plenum is adapted to receive a pressure sensing or recording instrument such as a standard aneriod manometer through the stopper assembly which transmits pressure to the manometer.

The device is designed to be sterilized and packaged at the point of manufacture and thrown away after one use. The standard pressure sensing device is attached at the point of use and because of the sterilized diaphragm, it may be used repeatedly without sterilization. In addition, the device can be provided with various closure means to keep the stopper assembly and tube barrel in a sealed relationship.

The invention accordingly comprises the features of construction, combination of elements and arrangements of parts will willl be exemplified in the construction hereinafter set forth and the scope of the invention will be indicated in the claims.

BRIEF DESCRIPTION OF THE DRAWINGS

FIG. 1 discloses a perspective view of the prior disposable manometer device;

FIG. 2 discloses a partial cross sectional view of an unassembled embodiment of the invention utilizing a heat shrink material;

FIG. 3 discloses a cross sectional view of the assembled embodiment of FIG. 2;

FIG. 4 discloses a cross sectional view of a modification of the embodiment disclosed in FIG. 3;

FIG. 5 discloses a perspective view of a fluted diaphragm used with the invention; and FIG. 6 shows a cross section of the fluted diaphragm taken along line 17'—17' of FIG. 16.

DETAILED DESCRIPTION OF THE PREFERRED EMBODIMENTS

Figure 16:
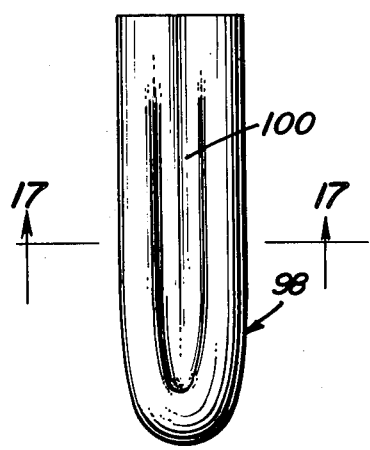
Figure 17:
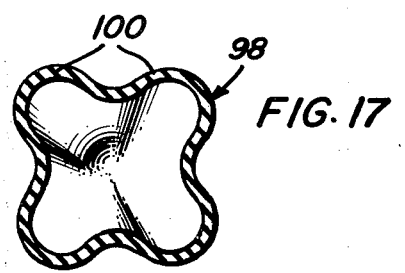

Referring now to the drawings, the present invention is shown and generally referred to by the reference number 10. The invention 10 comprises a tube or barrel 12 having at one end a catheter or hypodermic needle connector also called male luer lock 14 and at the distal end a tube orifice 18 adapted to receive stopper means and a pressure sensing means such as standard aneroid manometer 16 or other standard pressure sensing or recording device such as that shown in FIG. 1. Inserted within tube 12 is a flexible diaphragm 20 which is placed in an airtight seal when a resilient stopper 22 or the like is fitted into tube orifice 18. The stopper 22 is preferably constructed with a throughgoing bore 23. Surrounding tube orifice 18 is a radially extending lip or projection 26 which is integral with tube 12. The lip or projection 26 aids in the insertion and removal of the nipple or stem (not shown) of a standard aneroid manometer 16 or other pressure sensing or recording device into or out of the bore 23 of stopper 22 as it allows the operators fingers to more easily grasp the device. However, the lip or projection 26 primary function is to act as a stop for stopper retaining means contacting the stopper 22 to prevent the stopper 22 from slipping out of the end of tube 12 when manometer 16 is inserted or will remain between stopper 22 and tube 12.

In the preferred modification of the invention a heat shrink material 40 in tubular form such as that shown in FIG. 2 is inserted over the stopper 22, barrel 12 and lip 26. After the sleeve of heat shrink material 40 has been placed around the stopper 22, barrel 12 and lip 26 heat is applied to the heat shrink material 40 causing the material to contract or shrink around the barrel and stopper holding them in a fixed position. In the embodiment shown in FIG. 3 a manometer stem can be inserted into the aperture 42 formed by the shrunken material 40 so that the stem can be inserted into bore 23 of the stopper 22. In another embodiment shown in FIG. 4, the stopper 22 is shown with tapered or inclined sides 43 appearing as a truncated cone or frusto conical configuration so that the heat shrink material 40 evenly contracts over the tapered sides and does not bunch up to form the extended aperture 42 as is shown in the embodiment of FIG. 3.

During operation of disposable manometer device 10, any of the above indicated closure means insures that stopper 22 will not be forced out of its sealing relationship with tube orifice 18 even if the pressure within tube 12 becomes very high.

In operation, the various elements of the device, excluding aneroid manometer 16, are sterilized, assembled and individually packaged at the place of manufacture. The component parts excluding some of the closure apparatus are made of inexpensive material such as plastic and the like and the device is designed to be disposed of after one use. At the point of use, the package is opened and the device removed. The invention may have a standard catheter and hypodermic needle (not shown) already attached at the factory or the catheter and hypodermic may be attached at the time of use. It is contemplated that the lower plenum 74 of the disposable manometer invention 10 defined by the lower end of tube 12, diaphragm 20 and catheter connector 14, together with catheter and hypodermic needle 20, if connected, may if desired be filled with a heparinized saline or similar solution to insure that no air is trapped in that portion of the system. Alternatively, this lower plenum 74 may contain air which will be compressed when a catheter is connected to a source of superatmospheric pressure. If desired, a bleeding means such as a valve shown in the parent application can be placed in the wall of tube 12 to allow air to be bled out of the system as blood (not shown) or other fluid is drawn into catheter and lower plenum 74.

The upper plenum 76 may be filled with a non-corrosive, non-compressible, liquid which will aid in the transmission of undampened pressure variations, especially if fluid is also utilized in lower plenum 74. If the plena are to be filled with air, the pulsations will be dampened. Alternatively, however, stopper bore 23 and/or the luer lock connector 14 may be plugged with a removable plug (not shown) or frangible cover to prevent leakage of liquid put in at time of manufacture prior to use.

After the disposable manometer 10 is removed from its sterilized container, the user inserts the aneroid manometer 16 or other sensing recording device into stopper hole 23. When determining venous pressure, a tourniquet is applied to the upper arm of the patient and vein puncture is performed with the hypodermic needle (not shown) in the usual fashion. When no fluid is utilized in either plena 74 and 76, entrance of the needle into the vein is confirmed by the visual indication of a flow of blood into catheter and catheter connector 14. The tourniquet is thereupon released, allowing an equilibration of pressure. At this time diaphragm 20 will transmit the pressure variations to the indicating fluid in upper plenum 76 which consequently causes registration on the manometer dial 80. After the arterial or venous pressure has been monitored, the hypodermic needle (not shown) is removed from the vein and manometer 16 removed from stopper 22. The disposable manometer 10 is then discarded.

When measuring cerebrospinal fluid pressure, the device is assembled in the same way as before. Spinal puncture is performed in a well known manner, e.g. by lying the patient on his side with his knees flexed. The area to be pierced, usually the third or fourth lumbar interspace, is prepared by sterile cleansing, then infiltrated with one percent procaine and then the hypodermic needle (not shown) is inserted into the area. Penetration into the spinal canal may be felt by the giving way of the spinal ligaments. If the needle is properly located, there will be a visual indication of the cerebrospinal fluid therein.

Insofar as the specific dimensions of disposable manometer 10, it is within the contemplation of this invention that tube 12 could be of another cross section such as rectangular, triangular, oval and etc. Further, it is contemplated that catheter connector 14 be located eccentrically with tube 12 or even transversely located on the side wall of tube 12.

An alternative form of the diaphragm which may be used with any of the embodiments previously disclosed is that of the fluted diaphragm 98 shown in FIGS. 5 and 6. The fluted diaphragm 98 is molded to absorb any pressures which may occur when the stem of the manometer is inserted into the stopper. While preferably, four flutes are used on the diaphragm, any number of flutes 100 are envisioned as being added in order to make the diaphragm to correctly work. In the presently used disposable blood pressure manometer it was necessary to partially compress the diaphragm before inserting the gage so that there would be no pressure introduced when the gage was fitted into the stopper. If the diaphragm is made so that it is fluted in the long direction of the diaphragm the diaphragm would expand or retract in response to pressure without the need for adding or subtracting a saline solution.

The diaphragm 20 could be molded into tube 12 at any location along its length, or it could be attached to catheter connector 14 or any other suitable location to isolate lower and upper plena 74 and 76.

It is also understood that the following claims are intended to cover all the generic and specific features of the invention, which as a matter of language, might be said to fall therebetween.

What is claimed is:

1. A disposable blood pressure monitor comprising an elongated tubular structure, means on one end of said tubular structure adapted to place the interior of said tubular structure in direct communication with the blood pressure system to be monitored with the other end terminating in a lip configuration, a flexible sacklike membrane received within the lip end of the tubular structure, said sacklike membrane separating said tubular structure into first and second chambers, adapted to transmit pressure of the blood pressure system to be monitored and a one-hole stopper frictionally engaging the inner surface of said tubular structure with the peripheral edge of said sacklike membrane being sealingly positioned between the inner surface of said tubular structure and the outer surface of said stopper, a cover member made of heat, shrinkable material placed over the outer surface, of said stopper and the outer surface of said tubular structure and shrunk over the top and sides of said stopper to hold said stopper and tubular structure is a fixed relationship to prevent accidental dislodging thereof said heat shrinkable material when shrunk defining an aperture over the hole of said one hole stopper so that pressure indicating means can be detachably and sealingly received within the hole of said one hole stopper without rupturing said heat shrinkable material.

2. A disposable blood pressure monitor as claimed in claim 1 wherein said stopper is tubular with a tapered top section having substantially conical configuration.

3. A disposable blood pressure monitor as claimed in claim 1 wherein said cover member has a tubular configuration.

4. A disposable blood pressure monitor comprising an elongated tubular structure; means on one end of said tubular structure adapted to place the interior of said tubular structure in direct communication with the blood system to be monitored; a flexible sacklike membrane received within the other end of said tubular structure which end defines a projection means, said membrane separating said tubular structure into first and second chambers adapted to transmit pressure of the blood pressure system to be monitored; a one-hole tubular stopper having tapered ends one of which frictionally engages said other end of said tubular structure and the other projecting beyond said other end of said tubular structure with the peripheral edge of said membrane sealingly positioned between the internal surface of said tubular structure and the external surface of one end of said stopper; a cylindrical open ended sleeve member placed over said tubular structure and said stopper, said cylindrical member being shrunk to engage the projection means and body of the tubular structure and the tapered end of the stopper member projecting beyond said tubular structure in a snug fixed substantially immovable relationship flush with the end of said projecting stopper member tapered end.

5. A disposable blood pressure monitor as claimed in claim 4 wherein said projection means is an annular rim.

6. A disposable blood pressure monitor as claimed in claim 4 wherein said stopper tapered projecting end has a substantially frusto conical configuration.

* * * * *